(12) United States Patent
Du et al.

(10) Patent No.: US 9,182,944 B2
(45) Date of Patent: *Nov. 10, 2015

(54) MANAGING LIFECYCLE OF OBJECTS

(75) Inventors: Bing Bing Du, Beijing (CN); Li Liu, Beijing (CN); Yue Wang, Beijing (CN); Yi San Zhao, Beijing (CN); Pu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1372 days.

This patent is subject to a terminal disclaimer.

(21) Appl. No.: 12/894,394

(22) Filed: Sep. 30, 2010

(65) Prior Publication Data

US 2011/0107302 A1 May 5, 2011

(30) Foreign Application Priority Data

Oct. 30, 2009 (CN) .......................... 2009 1 0211317

(51) Int. Cl.
*G06F 9/44* (2006.01)

(52) U.S. Cl.
CPC ........................................ *G06F 8/10* (2013.01)

(58) Field of Classification Search
None
See application file for complete search history.

(56) References Cited

U.S. PATENT DOCUMENTS

| | | | |
|---|---|---|---|
| 8,073,731 B1 * | 12/2011 | Rajasenan .................... | 705/7.42 |
| 8,108,834 B2 | 1/2012 | Oren et al. | |
| 8,239,819 B2 * | 8/2012 | Hafermann et al. .......... | 717/100 |
| 8,244,855 B1 * | 8/2012 | Walsh et al. .................. | 709/224 |
| 8,683,434 B2 | 3/2014 | Charfi et al. | |
| 2004/0019601 A1 * | 1/2004 | Gates ............................ | 707/102 |
| 2004/0143811 A1 * | 7/2004 | Kaelicke et al. .............. | 717/101 |
| 2005/0234957 A1 * | 10/2005 | Olson et al. ................... | 707/101 |
| 2006/0069602 A1 * | 3/2006 | Messer et al. ..................... | 705/9 |
| 2007/0027887 A1 * | 2/2007 | Baldwin ....................... | 707/100 |
| 2007/0150322 A1 | 6/2007 | Falchuk et al. | |
| 2008/0168017 A1 * | 7/2008 | Sreedhar et al. ................ | 706/47 |
| 2009/0055410 A1 | 2/2009 | Colgrave et al. | |

(Continued)

FOREIGN PATENT DOCUMENTS

EP 1898345 A1 3/2008

OTHER PUBLICATIONS

"Introducing IBM WebSphere Service Registry and Repository, Part 2: Architecture, APIs, and Content," McKee et al., http://www.ibm.com/developerworks/websphere/library/techarticles/0609_mckee2/0609_mckee2.html, Sep. 29, 2006.

(Continued)

*Primary Examiner* — Li B Zhen
*Assistant Examiner* — Evral Bodden
(74) *Attorney, Agent, or Firm* — Winstead, P.C.

(57) ABSTRACT

A system and computer program product for managing the lifecycle of an object, where the lifecycle involves a plurality of states of the object, at least one transition between the plurality of states and at least one role who has authority to execute the at least one transition. At least one of the plurality of states, the at least one transition and the at least one role is mapped to Web Ontology Language (OWL) elements. The role related control information is obtained using the reasoning ability of OWL itself according to the above mapping. Furthermore, the lifecycle is managed according to the above role related control information. Using the principles of the present invention, the access control information of roles can be embedded into the lifecycle description and therefore the lifecycle management can be realized easily.

16 Claims, 7 Drawing Sheets

(56) References Cited

U.S. PATENT DOCUMENTS

| | | | |
|---|---|---|---|
| 2009/0192976 A1 | 7/2009 | Spivack et al. | |
| 2009/0249294 A1* | 10/2009 | Ocke et al. | 717/117 |
| 2012/0109708 A1 | 5/2012 | Mueller et al. | |
| 2013/0268911 A1 | 10/2013 | Charfi et al. | |

OTHER PUBLICATIONS

"A Flexible Approach to Service Management-Related Service Description in SOAs," Schropfer et al., http://www.iks.inf.ethz.ch/wewst06/205.pdf, http://ftp.informatik.rwth-aachen.de/Publications/CEUR-WS/Vol-234/paper4.pdf, Dec. 4, 2006.

"Lifecycle-Support in Architecture for Ontology-Based Information Systems," Tran et al., http://www.aifb.uni-karlsruhe.de/WBS/dtr/papers/Lifecycle-Support.pdf, Feb. 1, 2008.

"Dynamic Activity Lifecycle Management in Ubiquitous Computing Environments," Kim et al., Computer and Information Technology, 7th IEEE International Conference on Computer and Information Technology, Oct. 16, 2007.

Office Action for U.S. Appl. No. 13/405,272 dated May 17, 2013.

Office Action for U.S. Appl. No. 13/405,272 dated Nov. 19, 2013, pp. 1-30.

Office Action for U.S. Appl. No. 13/405,272 dated Jul. 16, 2014, pp. 1-19.

Office Action for U.S. Appl. No. 13/405,272 dated Mar. 25, 2015, pp. 1-27.

* cited by examiner

MANAGING LIFECYCLE OF OBJECTS

CROSS-REFERENCE TO RELATED APPLICATIONS

This application claims priority under 35 U.S.C. §119(a) from Chinese Patent Application No. 200910211317.9, filed on Oct. 30, 2009, the contents of which are incorporated herein by reference.

TECHNICAL FIELD

The present invention relates to a method and system for managing a lifecycle of objects, and more particularly, to a method and system for managing the lifecycle of objects using Web Ontology Language (OWL).

BACKGROUND

Lifecycle is a formal evolution and change through the recurrence of a certain organism from its initial phase to the same phase in its next generation. In different fields, lifecycle has various detailed explanations for different objects.

For example, in the case that said objects are certain products, the lifecycle involves all phases of the products, e.g., designing, manufacturing, packaging, storing, selling, etc. In the service-oriented architecture where said objects are services, the lifecycle starts with a service definition and ends with a service retirement. The following is a detailed description about a lifecycle using a service as an example. More specifically, the service lifecycle includes various phases and states that the service may experience, such as defined, modeled, assembled, deployed and managed, as well as transitions between these states, for example, the developing process from the assembled state to the deployed state, or the testing process from the deployed state to the managed state. Each transition relates to certain roles, for example, the developing process is executed by developers and the testing process is executed by testers. Therefore, the service lifecycle involves so many factors, such as various states, various transitions and various roles that how to manage it has become an issue. For example, it is desired that a lifecycle management system could enable managers to track service states in different phases, differentiate their corresponding authority when different roles log into such a management system, and provide a proper transition path and specify the involved roles when a service transits from one state to another. To realize the above management, there is a need to know and express the various information in the lifecycle, especially role-based access control information. For instance, who, when and how to change and transit a service, etc. However, the existing techniques fail to meet the needs of the above-described lifecycle management.

Usually, the lifecycle can be represented using a state machine. A state machine is a type of directional diagram, which depicts various states and the transitions between these different states. In a traditional object-oriented approach, state machine diagrams are used to illustrate the behavior of an object and how an object responds to various events, including internal and external stimulus. In the existing techniques, multiple languages have been adopted to describe a state machine and a lifecycle.

UML state machine diagrams describe the behavior and change of a class over time by presenting the state and transition of a single object progressing through its lifecycle. The UML 2.0 state machine is a representation of a finite state machine. In the industrial and academic world, there have been applied many UML 2.0 state machine products. These products include IBM Rational Software Architect, Altova UModel 2008, UML State Machine Wizard, SDE for JDeveloper, etc. However, these state machine products mainly focus on the graphic illustration of a state machine. They consider roles and access control only as a common condition in the state machine, and therefore cannot judge which states can be accessed and which transitions are authorized for a certain role.

SCXML (State Chart XML) is another state machine notation based on UML 2.0, combining the conception from CCXML (Call Control XML) and Harel State Tables. Similar with UML 2.0, SCXML cannot consider role-based access control and therefore cannot judge the reachable states and the executable transitions of roles when describing the state machine.

SACL (State Adaptive Choreography Language) is another language to define a state machine, and is specifically designed to be used for a business state machine in a WebSphere Process Server. However, this language does not contain role-based access control either.

Moreover, the above-described UML, SCXML and SACL languages for presenting a state machine and lifecycle do not have semantics presenting ability, so further translation is necessary in the case that semantics are needed.

Web Ontology Language (OWL) is a semantics-based language used to publish and share ontology in the network. In some products, OWL is also used to describe the lifecycle. However, the current OWL files neither incorporate the information about role-based access control, nor utilize the reasoning ability of OWL itself to calculate the authority of each role.

On the other hand, the existing techniques have adopted various languages, for example, XACML (extensible Access Control Markup Language), to describe access control and role authority. However, these languages usually cannot describe the state machine and lifecycle.

Therefore, in the existing lifecycle management systems, when a user logs into a management system and wants to execute transitions and operations within its authority, the system first needs to get the user's authority description from XACML files. The system then reads the state machine described by UML, SACL, etc., translates it into OWL files with semantics content, gets the property information from OWL files and thus obtains the state and transition description in the lifecycle. By connecting the obtained role authority information with the state machine information, the system can finally judge which transitions in the lifecycle the current user can execute.

Obviously, the above management process is complicated and inefficient.

BRIEF SUMMARY

In one embodiment of the present invention, a computer program product embodied in a computer readable storage medium for managing a lifecycle of an object, where the lifecycle involves a plurality of states of the object, at least one transition between the plurality of states and at least one role who has authority to execute the at least one transition, comprises the programming instructions for mapping at least one of the plurality of states, the at least one transition and the at least one role to Web Ontology Language (OWL) elements. Furthermore, the computer program product comprises the programming instructions for obtaining role related control information using a reasoning ability of OWL itself according to the above mapping. Additionally, the computer program product comprises the programming instructions for managing the lifecycle according to the above role related control information.

Another form of the embodiment of the computer program product described above is in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

The following is the description of the embodiments in connection with the drawings.

Figure 1:
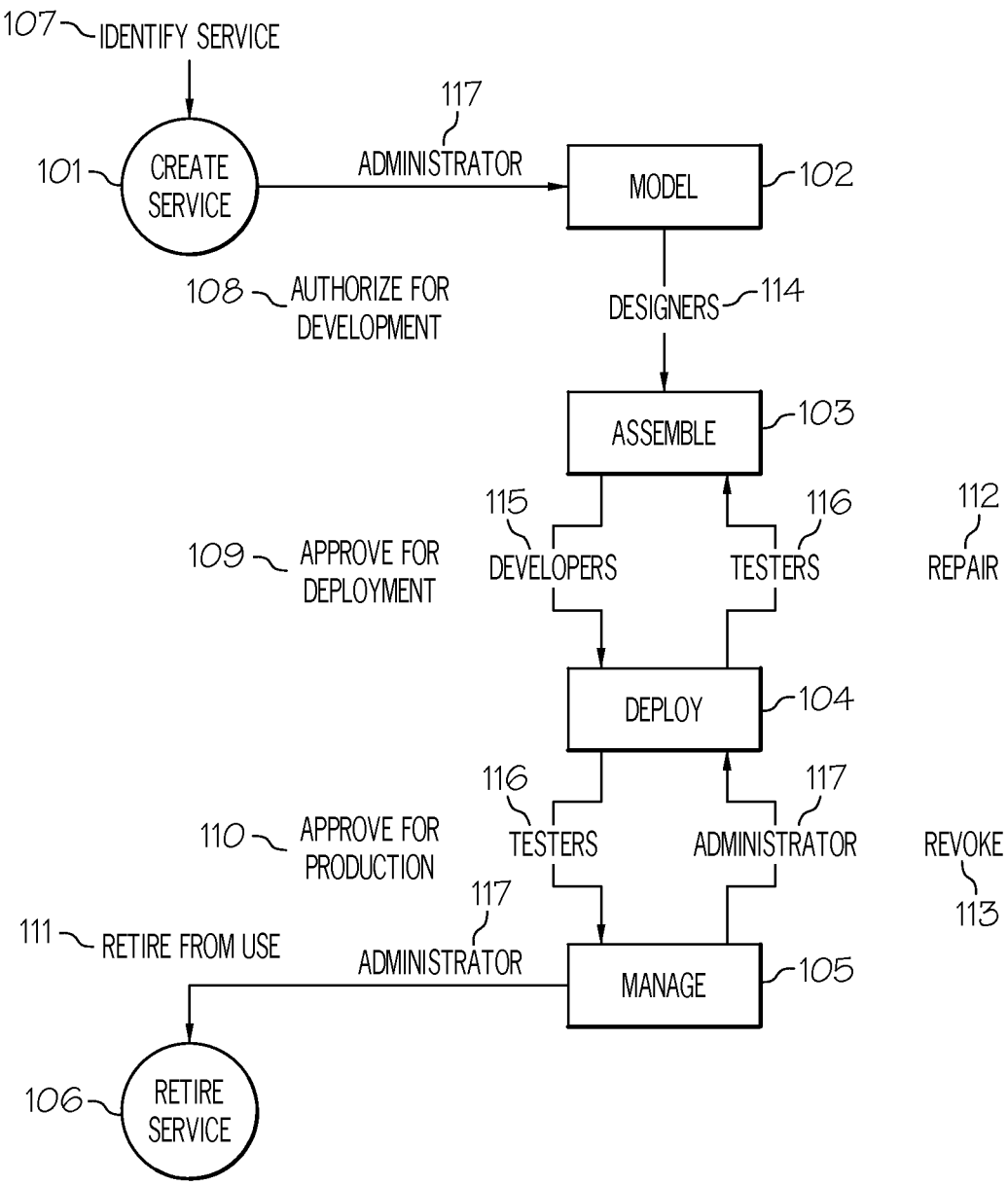
FIG. 1 exemplarily illustrates the lifecycle of a service in accordance with an embodiment of the present invention.

FIG. 1 exemplarily illustrates the lifecycle of a service in accordance with an embodiment of the present invention. As shown in FIG. 1, the lifecycle of the service involves six states which are created 101, modeled 102, assembled 103, deployed 104, managed 105 and retired 106 in order. Seven transitions (identify service 107, authorize for development 108, approve for deployment 109, approve for production 110, retire from use 111, repair 112, revoke 113) exist between these six states and four kinds of roles are involved: designers 114, developers 115, testers 116 and administrators 117. Specifically, administrators 117 define and create the service and transfer it to designers 114 to perform analysis and modeling. Designers 114 model the service and transfer it to developers 115 for assembling. Developers 115 assemble the service components and transfer it to testers 116 to perform deployment and testing. Testers 116 transfer the service to administrators 117 to perform management, or return the service to developers 115 to make repair, depending on the test result. Furthermore, administrators 117 can make the service retired or return it to testers 116 to check if there are any other problems.

The following is the description of the lifecycle definition and management, taking the lifecycle in FIG. 1 as an example.

Figure 2:
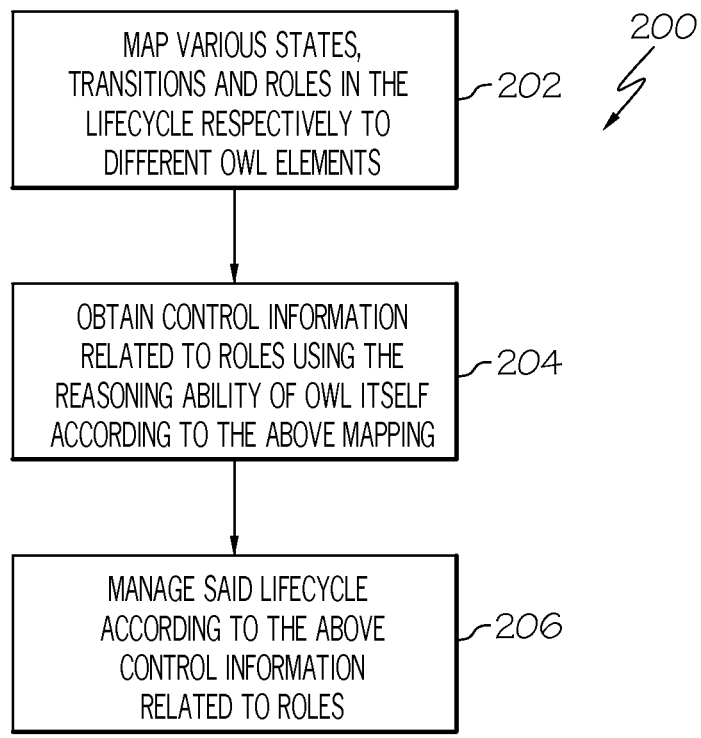
FIG. 2 is a flowchart of the method for managing a lifecycle according to one embodiment of the present invention.

According to one embodiment of the present invention, a method 200 for managing the lifecycle of an object is provided, wherein said object can be various management objects, such as products or services, and said lifecycle involves various states, various transitions between these states and various roles who have authority to execute these transitions, as shown in FIG. 1. The flowchart of method 200 is illustrated in FIG. 2. In FIG. 2, method 200 for managing lifecycle comprises: step 202, at which said various states, transitions and roles are mapped to OWL elements respectively; step 204, at which the control information related to said roles is obtained using the reasoning ability of OWL itself according to the above mapping; and step 206, at which the lifecycle is managed according to the above control information related to roles.

Referring to FIG. 2, step 202 represents the mapping from the factors (states, transitions and roles) in the lifecycle to the OWL elements. As a web ontology language, OWL mostly uses the basic elements, such as classes, individuals and properties to present semantics and make reasoning. The following is the description of these elements in connection with the mapping process.

Figure 3:
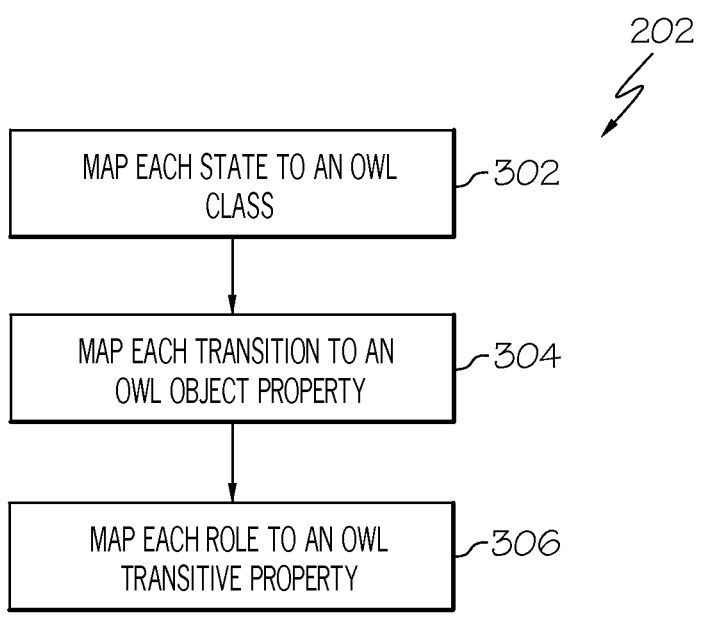
FIG. 3 is a flowchart of the sub-steps of step 202 in FIG. 2 according to one embodiment of the present invention.

In one embodiment, step 202 comprises a plurality of sub-steps, as shown in FIG. 3. Specifically, FIG. 3 illustrates the sub-steps of step 202 in FIG. 2 according to one embodiment of the present invention, wherein said sub-steps include: step 302, at which each state is mapped to an OWL class; step 304, at which each transition is mapped to an OWL object property; and step 306, at which each role is mapped to an OWL transitive property.

Firstly, the mapping at step 302 will be described. In OWL, a class is a set of individuals. This conception is almost the same with the class conception in OO (Object-Oriented) language. In OWL, any individual is an instance of class owl: Thing. Therefore, any user-defined class is a subclass of class owl:Thing. A subclass will inherit all property restrictions from its super class.

At step 302, each state in the lifecycle can be mapped to an OWL class, the available transitions from each state are represented as property restrictions of the mapped class, and the target state of each transition is represented as a property value. The following is an exemplary code segment to show the mapping process.

```
<owl:Class rdf:ID="Model">
    <rdfs:subClassOf>
        <owl:Restriction>
            <owl:onProperty rdf:resource=
            "#AuthorizedForDevelopment"/>
                <owl:allValuesFrom rdf:resource=
                "#Assemble"/>
        </owl:Restriction>
    </rdfs:subClassOf>
    rdfs:subClassOf rdf:resource="&owl;Thing"/>
</owl:Class>
<owl:Class rdf:ID="Composite state">
    <rdfs:subClassOf>
        <owl:Class>
        <owl:unionOf rdf:parseType="Collection">
            <owl:Class rdf:about="#Model"/>
            <owl:Class rdf:about="#ServiceIdentified"/>
        </owl:unionOf>
        </owl:Class>
    </rdfs:subClassOf>
    <rdfs:subClassOf rdf:resource="&owl;Thing"/>
</owl:Class>
```

In the above code, <owl:Class rdf:ID="Model"> means that a class named "Model" is defined. This class represents the starting analysis and modeling phase of a service or an object, which can be seen as the initial state in the lifecycle. <rdfs:subClassOf> means that the class "Model" is a subclass of the following class and class "Model" can also satisfy the property restrictions constrained on the following class. <owl:Restriction> represents an anonymous type to add any property restriction. <owl:onProperty rdf:resource="#AuthorizedForDevelopment"/> means that a property restriction named "AuthorizedForDevelopment" is defined. As above-described, this property restriction represents a transition, meaning that via this transition the service or the object in "Model" state can transit from "model" state to another state. Property restrictions can represent the possible transitions from a certain state in the lifecycle management. <owl:allValuesFrom rdf:resource="#Assemble"/> means that the value of the above property restriction is defined. This value represents the target state of said transition, meaning that the service or the object can come into "Assemble" state from "Model" state after the above transition. Property value can represent the target state of a certain transition. The following sentence means that the defined class is a subclass of class "Thing." The above code segment uses the property restriction (owl:onProperty) to define the state transition in the lifecycle and uses the value (owl:allValuesFrom) of the property restriction to define the target state of that transition.

<owl:Class rdf:ID="Composite state"> represents a union class named "Composite state," which contains the definition of class "Model" and class "ServiceIdentified," and can be seen as a composite state definition in the lifecycle management. A composite state contains a plurality of other simple states and transitions. <rdfs:subClassOf> means that class "Composite state" is a subclass of the following class. <owl:Class> represents an anonymous class, which can be described by enumeration, to present simple states that are included in the composite state. <owl:unionOf rdf:parseType="Collection"> represents the set of class definitions in the composite state, i.e., the set of all simple states in the composite state. <owl:Class rdf:about="#Model"/> represents a particular class "Model" in the set of class definitions, which can be a simple state contained in "Composite state."<owl:Class rdf:about="#ServiceIdentified"/> represents another class "ServiceIdentified" in the set. The above code segment defines the composite state in the lifecycle management by enumeration (owl:unionOf).

In a word, a state named "Model" and a composite state named "Composite state" are described in the above code. The composite state consists of a plurality of other simple states and transitions. "Model" state can switch to "Assemble" state via transition "AuthorizedForDevelopment." Thus, by mapping states to classes and adding property restrictions on the classes, the modeled state and the assembled state in the lifecycle in FIG. 1, and the transition (AuthorizedForDevelopment) between the two states can be defined. Moreover, it can be seen that OWL classes can also describe composite states.

Now the mapping process from transitions to OWL object properties at step 304 will be described.

It is known that things are described using binary relation in RDF/OWL. For example, "Tom is a man" is described as "Tom—is →Man" in RDF/OWL, in which the relation "—is→" between "Tom" and "Man" is a property in RDF/OWL. That is, a property is a binary relation. OWL distinguishes two main categories of properties: datatype properties and object properties, wherein datatype properties describe the relation between classes and their instances while object properties describe the relation between instances of different classes. Since a property is a binary relation as shown above, a property has two points with the starting point and ending point both being individuals (instances). The source set, or named domain, is used to describe the class of the starting point instances and the image set, or named range, to describe the class of the ending point instances. In other words, the source set is the class to which a property belongs and the image set is the class to which a property points. Similar to the conception of class, a property also has the conception of a subproperty. A subproperty in OWL meets the relation that if two individuals (x, y) satisfy property P1 and property P1 is a subproperty of property P2, then (x, y) also satisfy property P2.

Based on the above perception, each transition can be mapped to an OWL object property at step 304. Furthermore, the source set of the object property is restricted as the source state of the transition, and the image set of the object property is restricted as the target state of the transition. If a certain role is authorized to execute the transition, then the transition is restricted as a subproperty of the role. The following is the description of the mapping process in connection with an exemplary code segment.

```
<owl:ObjectProperty rdf:ID="AuthorizedForDevelopment">
    <rdfs:domain rdf:resource="#Model"/>
    <rdfs:range rdf:resource="#Assemble"/>
    <rdfs:subPropertyOf rdf:resource="#Designer"/>
</owl:ObjectProperty>
```

In the above code, sentence <owl:ObjectProperty rdf:ID="AuthorizedForDevelopment"> represents that an object property named "AuthorizedForDevelopment" is defined. The property means that the service or the object can be authorized for development, which can be seen as a transition in the lifecycle management. <rdfs:domain rdf:resource="#Model"/> means that the domain of said transition is "Model" state, that is, only the service or the object in "Model" state can be authorized for development and "Model" is the source state of transition "AuthorizedForDevelopment."<rdfs:range rdf:resource="#Assemble"/> means that the range of said transition "AuthorizedForDevelopment" is "Assemble" state, that is, the service or the object becomes "Assemble" state after being authorized for development and "Assemble" state is the target state of the transition. <rdfs:subPropertyOf rdf:resource="#Designer"/> represents that property "AuthorizedForDevelopment" is a subproperty of "Designer," meaning that role "Designer" has authority to execute the state transition. This restriction is used to present the access control information in the lifecycle management.

In a word, a transition named "AuthorizedForDevelopment" is described and assigned to the role "Designer" in the above code. According to the definition of the source set and the image set of the transition property, the source state of the transition is "Model" and the target state of the transition is "Assemble." Thus, by mapping a transition to an object property and defining its source set and image set, a transition of the lifecycle in FIG. 1 has been described. By defining a subproperty, the role authorized to execute the transition is also described.

Now the mapping from roles to OWL transitive properties at step 306 will be described.

In OWL, a transitive property has "transitive" nature, satisfying the following relation: if individual pair (x,y) satisfies property P, pair (y,z) also satisfies property P, and P is a transitive property, then pair (x,z) satisfies the property P. That is, if P(x,y) and P(y,z) are true, and P is transitive, then P(x,z) is true.

Based on the nature of transitive properties, at step 306, the role can be mapped to an OWL transitive property via the following code <owl:TransitiveProperty rdf:about="#Designer">. The code means that a transitive property named "Designer" is defined to represent the role of designer, which can be seen as the definition of roles in the lifecycle management. By defining roles as transitive properties, the execution of transitions performed by roles is transitive and coherent.

In a further embodiment, a super role "Root" can also be defined, who has authority to execute behaviors of any common role, such as a system administrator. This role is used for the administrator or when access control is unnecessary. Any other common role can be seen as a subproperty of role "Root."

Figure 4A:
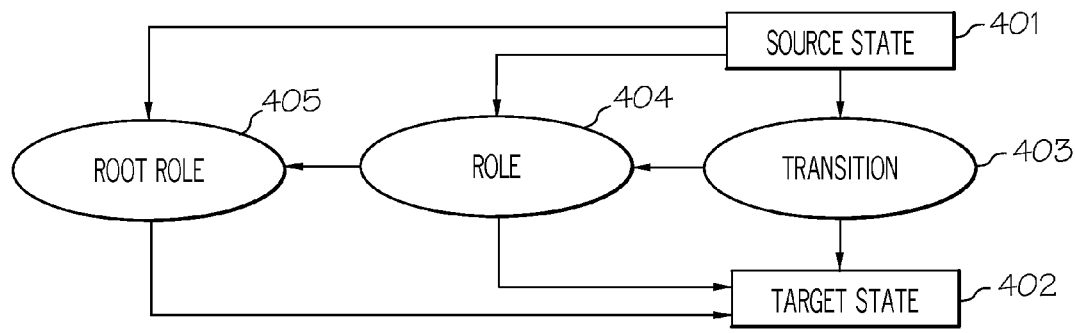
FIGS. 4A and 4B illustrate the relation between the factors of a lifecycle after mapping in accordance with an embodiment of the present invention.
Figure 4B:
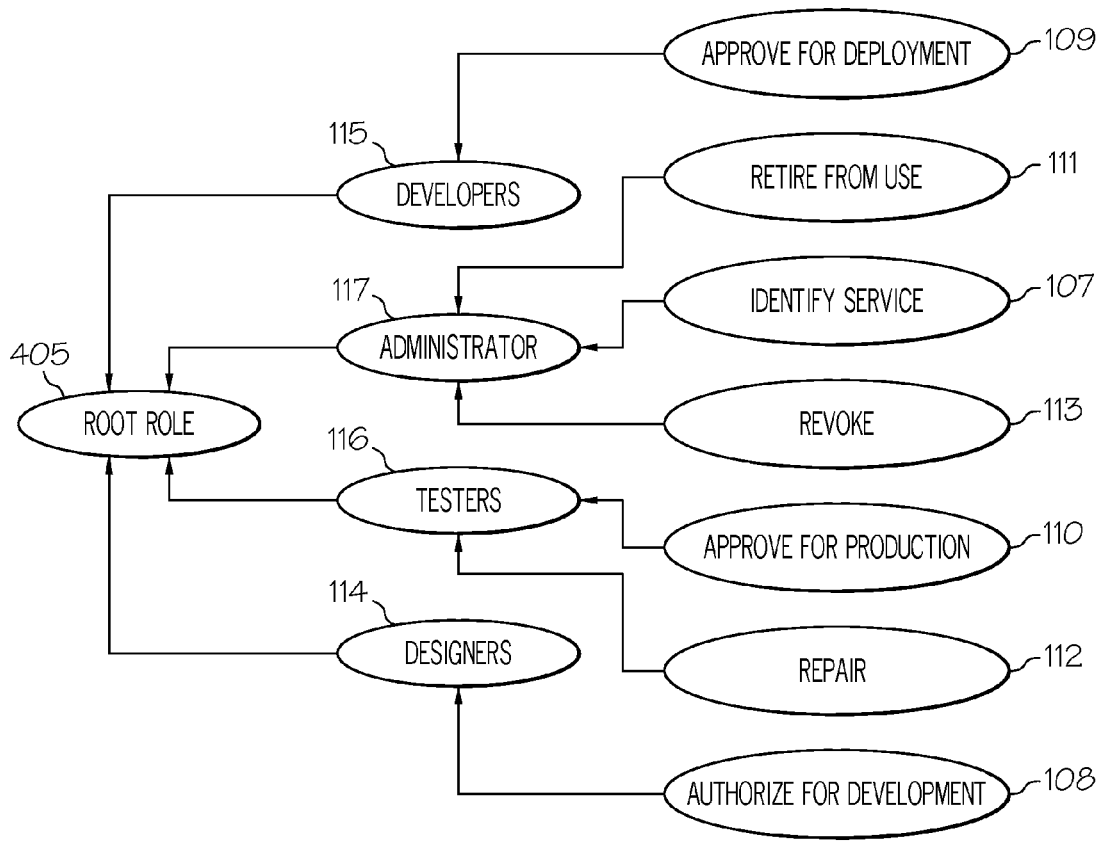

After mapping at each step in FIG. 3, the relation in FIGS. 4A and 4B can be obtained. FIG. 4A abstractively depicts the relation between a source state 401, a target state 402, a transition 403, a role 404 and a root role 405 in accordance with an embodiment of the present invention. Vertically, the starting point of a transition is source state 401 and the ending point is target state 402. Horizontally, the transition is a subproperty of the corresponding role 404 and the role 404 is a subproperty of root role 405, and therefore role 404 and root role 405 indirectly start with source state 401 and end with target state 402. FIG. 4B illustrates the relation between transitions and roles in connection with the lifecycle in FIG. 1 in accordance with an embodiment of the present invention. For example, referring to FIG. 4B in conjunction with FIG. 1, "approve for deployment" 109 is a subproperty of developers 115, "retire from use" 111, "identify service" 107, and "revoke" 113 are subproperties of administrators 117, "approve for production" 110 and "repair" 112 are subproperties of testers 116, "authorize for development" 108 is a subproperty of designers 114, meanwhile developers 115, administrators 117, testers 116 and designers 114 are all subproperties of root role "Root" 405.

After obtaining the relation in FIGS. 4A and 4B via the steps in FIG. 3, the lifecycle managing method in FIG. 2 advances to step 204, at which the transition control information related to roles is obtained according to the above relation using the reasoning ability of OWL itself. The following is the description of said reasoning process in connection with a part of a simple lifecycle.

Supposed the initial portion of a lifecycle involves three states: "created," "modeled" and "assembled." There are two transitions between these three states, "plan" from "created" to "modeled" and "AuthorizedDevelop" from "modeled" to "assembled." Further, these two transitions can be both implemented by role "Designer." Then according to the steps in FIG. 3, the following expressions can be obtained:

1. property plan(created, modeled), meaning that the source set of property "plan" is "created," the image set of property "plan" is "modeled," and class "created" has property "plan"
2. property AuthorizedDevelop (modeled, assembled)
3. "plan" is a subproperty of "Designer"
4. "AuthorizedDevelop" is a subproperty of "Designer"
5. "Designer" is a transitive property According to the above expressions, using the reasoning ability of OWL itself, the following reasoning process can be performed: since plan(created, modeled) and AuthorizedDevelop (modeled, assembled) are both subproperties of "Designer," "Designer" can have the same source set and image set with its subproperties, that is, Designer(created, modeled) and Designer(modeled, assembled) are true; furthermore, because "Designer" is a transitive property, "Designer" must satisfy Designer(created, assembled) according to the definition of transitive property. Thus, it can be educed that the transition from "created" to "assembled" can also be executed by "Designer." In the above process, although it does not apparently define who should execute the transition from "created" to "assembled," the role-based control information can be obtained automatically via the reasoning ability of OWL itself.

After getting the role-based control information by OWL reasoning, managing the lifecycle efficiently can be achieved in step 206 in FIG. 2.

Specifically in an embodiment of the present invention, the step of managing the lifecycle comprises providing user authority. That is, when a user enters into the lifecycle management system, the system calculates and provides the operations that the user has authority to execute. To calculate these operations, the system can first match the user to a certain role in the lifecycle, and then obtain the direct or indirect transition information related to the role according to the role-based control information reasoned by OWL.

In one embodiment, the calculation and provision of user authority is performed in real time and therefore the change of the lifecycle definition is not an issue. In other embodiments, user authority can also be calculated and stored beforehand.

Method 200 may include other and/or additional steps that, for clarity, are not depicted. Further, method 200 may be executed in a different order presented and the order presented in the discussion of FIGS. 2 and 3 is illustrative. Additionally, certain steps in method 200 may be executed in a substantially simultaneous manner or may be omitted.

Figure 5:
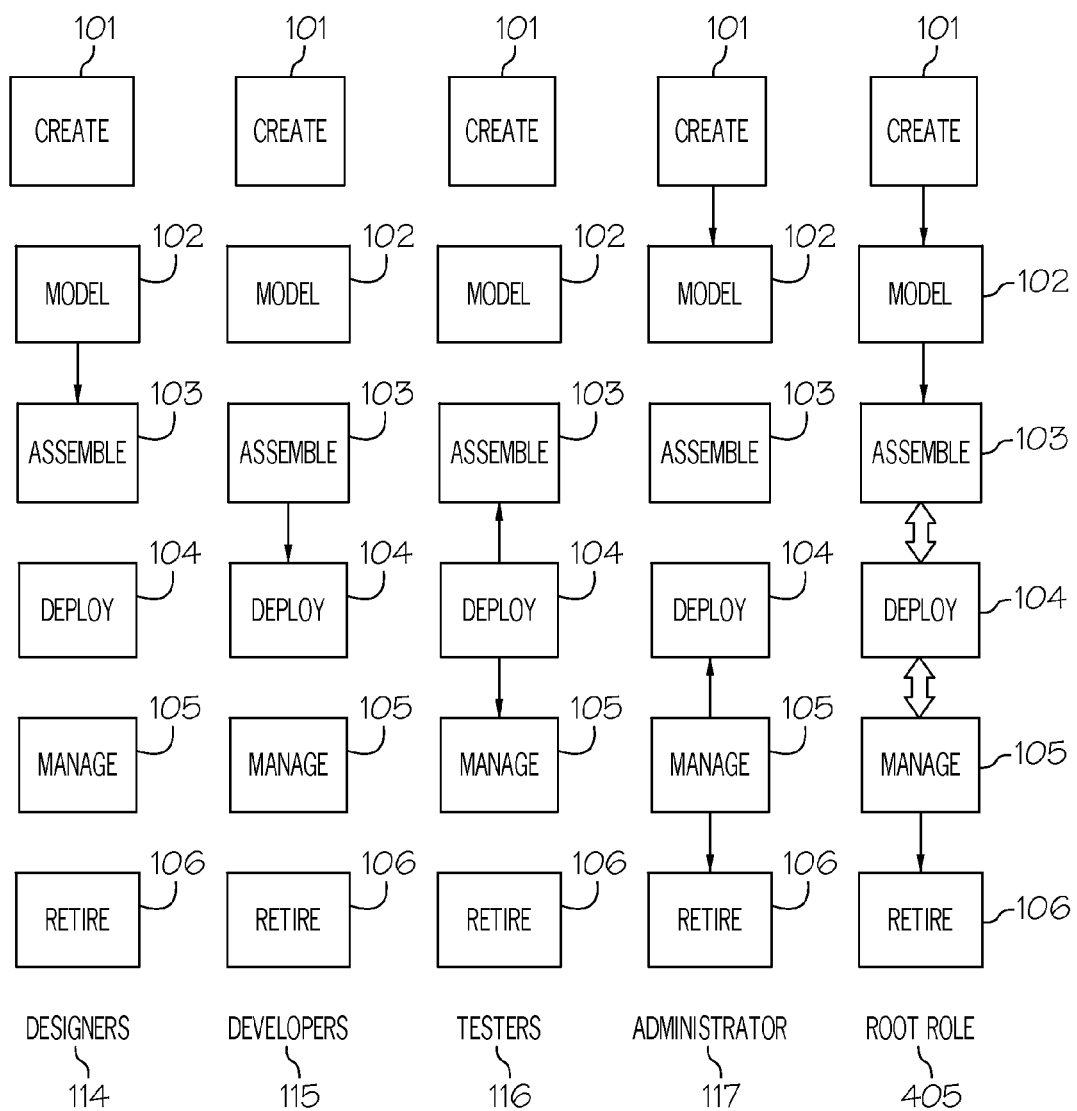
FIG. 5 illustrates the calculated authority of each role in accordance with an embodiment of the present invention.

FIG. 5 illustrates the authority of each role, which is calculated by reasoning, also taking the lifecycle in FIG. 1 as an example, in accordance with an embodiment of the present invention. Referring to FIG. 5, five columns present the transitions authorized for designers 114, developers 115, testers 116, administrators 117 and root role "Root" 405, respectively. When a certain role logs into the system, the system can get such reasoning result instantly and accordingly read the transitions and operations corresponding to the certain role immediately.

In one embodiment, the steps for managing the lifecycle comprises calculating the transition path between two states for a certain role. Specifically, when certain role "Role" enters the system and wants to transit from a source state S to a target state T, the system first needs to calculate whether the role has authority to execute such transition; if yes, it will calculate which states and transitions are necessary to reach state T.

Figure 6:
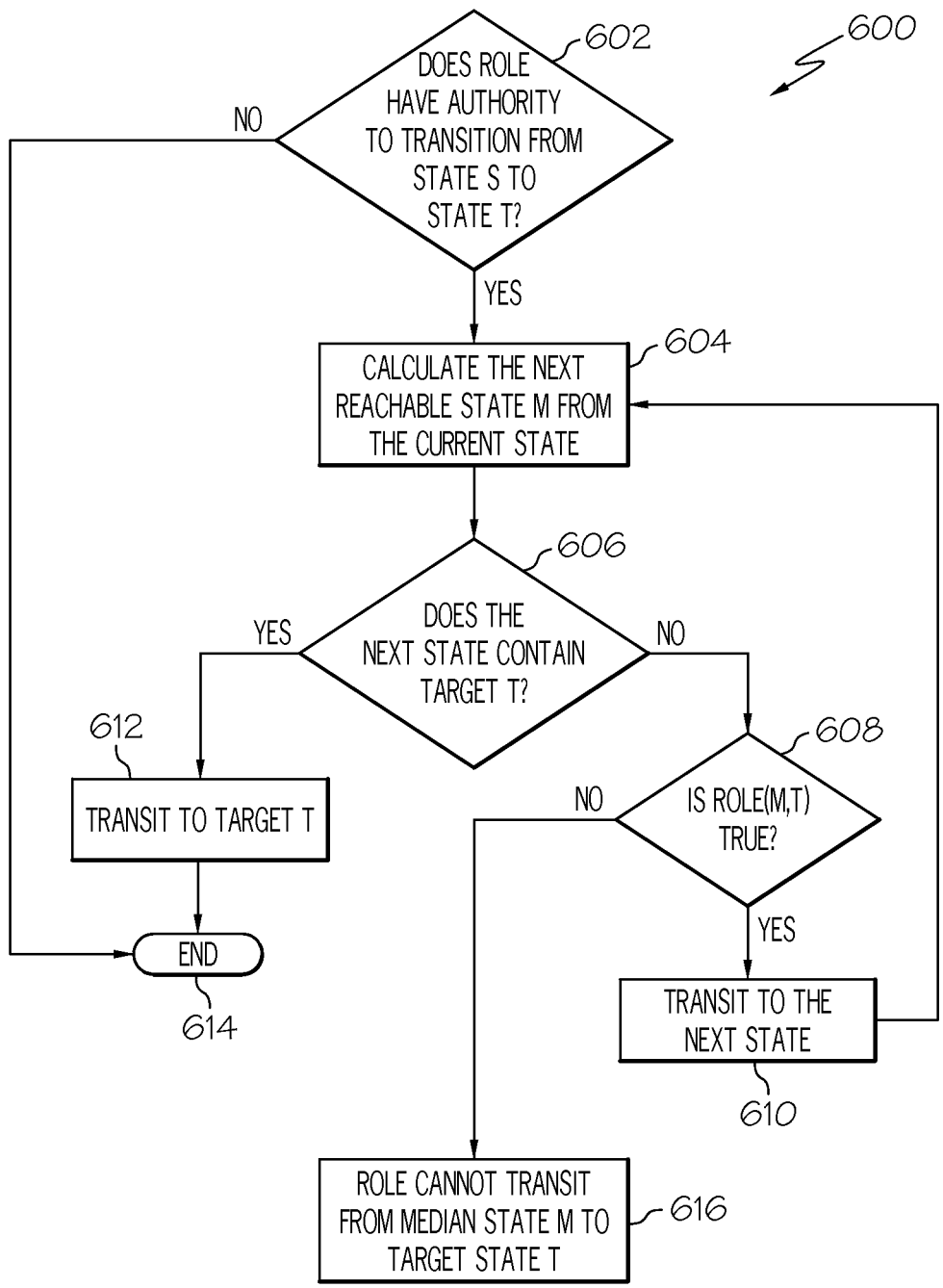
FIG. 6 is a flowchart of the method for calculating the transition path of a certain role according to one embodiment of the present invention.

FIG. 6 is a flowchart of a method 600 for calculating the transition path of a certain role according to one embodiment of the present invention. As shown in FIG. 6, it is judged whether the role has authority to transit from state S to state T firstly at step 602. According to the mapped relation of states, transitions and roles in lifecycle into OWL, it only needs to judge if Role(S, T) is true or false. If false, the process goes to step 614 and ends there. If Role(S, T) is true, the process goes to step 604 to get the reachable state m directly from state S. At this step, it only needs to get the value of all properties of source state S, which represent the median states after only one transition from state S. Then at step 606, it is judged whether the obtained median states m contain target state T: if yes, the transition is executed directly to target state T at step 612 and the process terminates at step 614; if the median states m do not contain target state T, then it is judged whether Role(m, T) is true or false at step 608 for each median state m, that is, whether Role can transit from median state m to target state T. For the median states whose judging result is true, the transition to this median state is executed at step 610 and the next reachable state is obtained at step 604 again, until the judging result at step 606 is true and the transition to target state T at step 612 is executed. For the median states whose judging result is not true, the Role cannot transit from median state m to target state T at step 616.

Method 600 may include other and/or additional steps that, for clarity, are not depicted. Further, method 600 may be executed in a different order presented and the order presented in the discussion of FIG. 6 is illustrative. Additionally, certain steps in method 600 may be executed in a substantially simultaneous manner or may be omitted.

It is understood that the above-described exemplary embodiments are intended to be illustrative in all respects of the method and system, rather than restrictive of this invention. Those skilled in the art can modify the above embodiments according to the features of different object lifecycles and the management needs. For example, in a lifecycle, if it only needs to manage which states a role can reach, then it can skip the definition of transitions and directly define the role as a property with the source set being the source state and the image set being the target state. In other embodiments, depending on the needs of OWL reasoning and management, transitions can also be mapped to OWL classes and roles mapped to property restrictions on the classes. The lifecycle management can further contain more comprehensive content, for instance, calculating the transition path involving the fewest roles between a certain source state and a certain target state, the transition path with the least transition times between a source state and a target state, etc.

Figure 7:
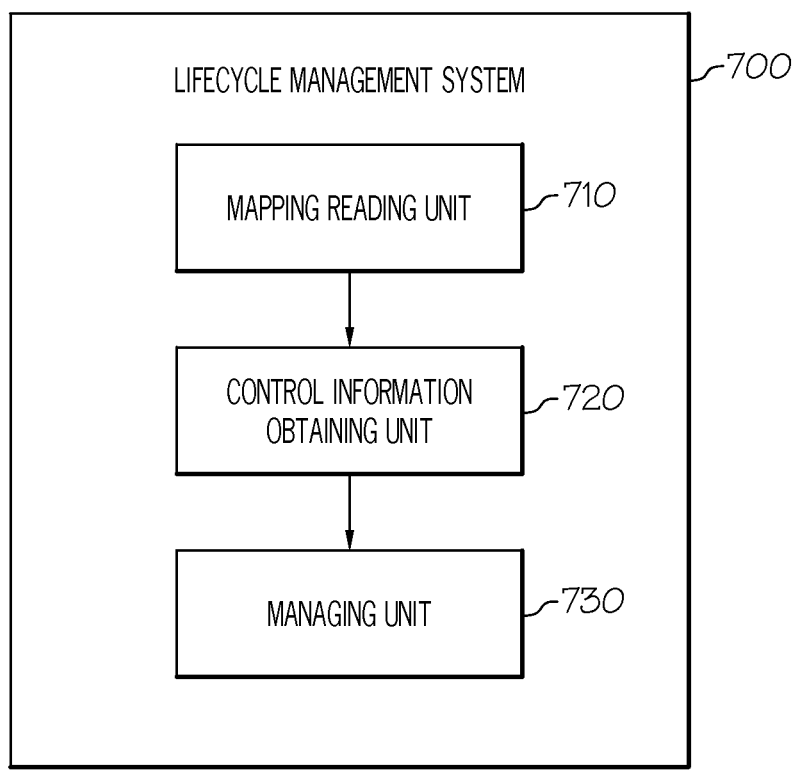
FIG. 7 is a block diagram of the system for managing the lifecycle according to one embodiment of the present invention.

Based on the same conception, the principles of the present invention also provide a system for managing the lifecycle of objects. FIG. 7 is a block diagram of the system for managing a lifecycle according to one embodiment of the present invention. As shown in FIG. 7, the lifecycle management system is labeled using number 700 as a whole. System 700 comprises a mapping reading unit 710, configured to read OWL files, in which the states, transitions and roles of the lifecycle are mapped to OWL elements respectively; a control information obtaining unit 720, configured to obtain the control information related to roles using the reasoning ability of OWL itself according to the above mapping; and a managing unit 730, configured to manage said lifecycle according to the above control information related to roles.

According to one embodiment, in the OWL files read by the mapping reading unit 710, each state of the lifecycle is mapped to an OWL class, each transition is mapped to an OWL object property, and each role is mapped to an OWL transitive property. More particularly, for each object property mapped from said each transition, its source set is restricted as the source state of the transition and its image set is restricted as the target state of the transition. Moreover, the object property is restricted as a subproperty of the transitive property mapped from the role who has authority to execute the transition.

In one embodiment, the management executed by managing unit 730 comprises: providing user authority, calculating the transition path between two states of a role, etc.

Because the operational principle and manner of system 700 accords with the above method for managing the lifecycle, it is needless to describe it again.

Figure 8:
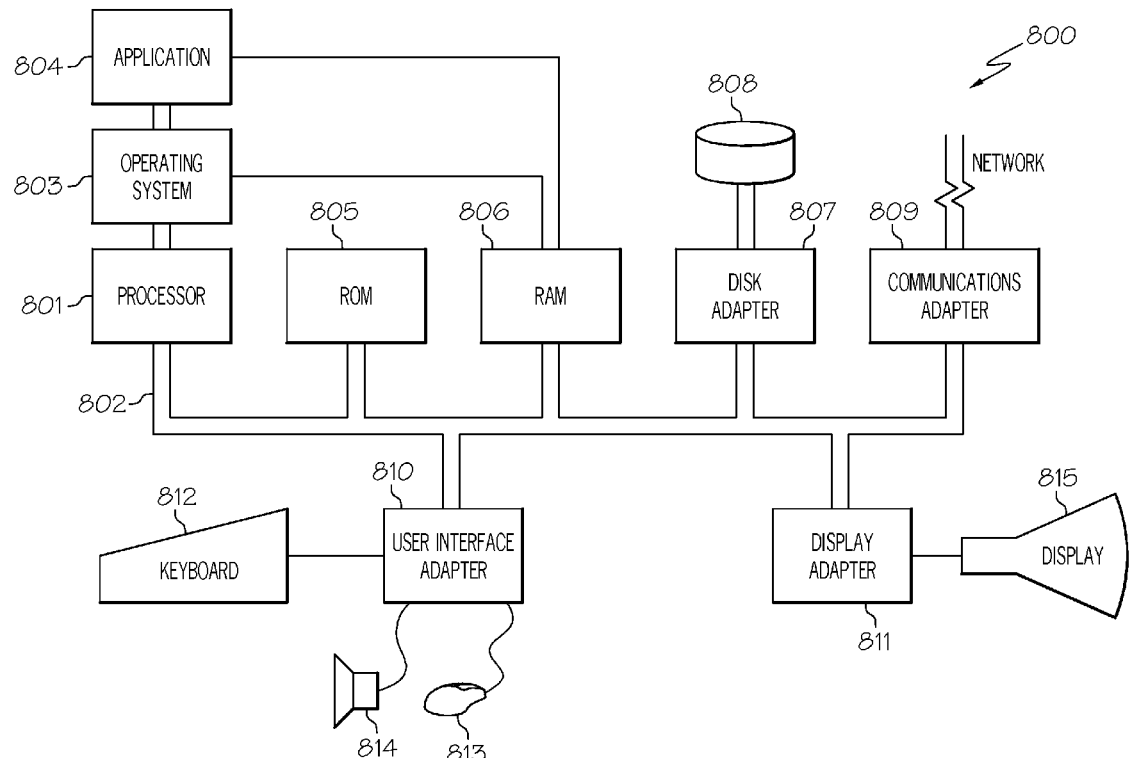
FIG. 8 illustrates a hardware environment for practicing the principles of the present invention in accordance with an embodiment of the present invention.

FIG. 8 depicts an embodiment of a hardware configuration of a computer system 800 which is representative of a hardware environment for practicing the present invention. Referring to FIG. 8, computer system 800 may have a processor 801 coupled to various other components by system bus 802. An operating system 803 may run on processor 801 and provide control and coordinate the functions of the various components of FIG. 8. An application 804 in accordance with the principles of the present invention may run in conjunction with operating system 803 and provide calls to operating system 803 where the calls implement the various functions or services to be performed by application 804 (e.g., application for managing the lifecycle of objects as discussed above).

Referring again to FIG. 8, read-only memory ("ROM") 805 may be coupled to system bus 802 and include a basic input/output system ("BIOS") that controls certain basic functions of computer device 800. Random access memory ("RAM") 806 and disk adapter 807 may also be coupled to system bus 802. It should be noted that software components including operating system 803 and application 804 may be loaded into RAM 806, which may be computer system's 800 main memory for execution. Disk adapter 807 may be an integrated drive electronics ("IDE") adapter that communicates with a disk unit 808, e.g., disk drive.

Computer system 800 may further include a communications adapter 809 coupled to bus 802. Communications adapter 809 may interconnect bus 802 with an outside network (not shown) thereby allowing computer system 800 to communicate with other similar devices.

I/O devices may also be connected to computer system 800 via a user interface adapter 810 and a display adapter 811. Keyboard 812, mouse 813 and speaker 814 may all be interconnected to bus 802 through user interface adapter 810. Data may be inputted to computer system 800 through any of these devices. A display monitor 815 may be connected to system bus 802 by display adapter 811. In this manner, a user is capable of inputting to computer system 800 through keyboard 812 or mouse 813 and receiving output from computer system 800 via display 815 or speaker 814.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A system for managing a lifecycle of an object, wherein said lifecycle involves a plurality of states of said object, at least one transition between said plurality of states and at least one role who has authority to execute said at least one transition, said system comprising:
    a mapping reading unit, configured to read Web Ontology Language (OWL) files, in which at least one of said plurality of states, said at least one transition and said at least one role is mapped to OWL elements;
    a control information obtaining unit, configured to obtain role related control information using a reasoning ability of OWL itself according to the above mapping; and
    a managing unit, configured to manage said lifecycle according to the above role related control information, wherein said mapping at least one of said plurality of states, said at least one transition and said at least one role to OWL elements comprises:
        mapping each state of said plurality of states to an OWL class;
        mapping each transition of said at least one transition to an OWL object property; and
        mapping each role of said at least one role to an OWL transitive property.

2. The system of claim 1, wherein said object comprises services and products.

3. The system of claim 1, wherein for the OWL object property mapped from each transition, its source set is defined as a source state of the transition and its image set is defined as a target state of the transition, and the OWL object property is defined as a subproperty of the OWL transitive property mapped from the role who has authority to execute the transition.

4. The system of claim 3, wherein in said OWL files, the transitive properties mapped from all roles are defined as subproperties of a property of a root role.

5. The system of claim 1, wherein said managing unit is further configured to calculate a transition path between two states for a certain role.

6. The system of claim 5, wherein said managing unit is further configured to:
    calculate a next reachable state by getting a property value of a class mapped from a current state;
    transit to the next state from which a target state can be reached when said next state does not contain the target state; and
    repeat the above steps until said next state contains the target state.

7. The system of claim 1, wherein said managing unit is further configured to provide user authority.

8. The system of claim 7, wherein said managing unit is further configured to match a user to a certain role in said lifecycle and determine the transitions that said certain role has authority to execute according to said role related control information.

9. A computer program product embodied in a non-transitory computer readable storage medium for managing a lifecycle of an object, wherein said lifecycle involves a plurality of states of said object, at least one transition between said plurality of states and at least one role who has authority to execute said at least one transition, the computer program product comprising the programming instructions for:

mapping at least one of said plurality of states, said at least one transition and said at least one role to Web Ontology Language (OWL) elements;

obtaining role related control information using a reasoning ability of OWL itself according to the above mapping; and managing said lifecycle according to the above role related control information, wherein said mapping at least one of said plurality of states, said at least one transition and said at least one role to OWL elements comprises:

mapping each state of said plurality of states to an OWL class;

mapping each transition of said at least one transition to an OWL object property; and mapping each role of said at least one role to an OWL transitive property.

10. The computer program product of claim 9, wherein said object comprises services and products.

11. The computer program product of claim 9, wherein for the OWL object property mapped from each transition, its source set is defined as a source state of the transition and its image set is defined as a target state of the transition, and the OWL object property is defined as a subproperty of the OWL transitive property mapped from the role who has authority to execute the transition.

12. The computer program product of claim 11, wherein the programming instructions for mapping at least one of said plurality of states, said at least one transition and said at least one role to OWL elements further comprises the programming instructions for:

defining the transitive properties mapped from all roles as subproperties of a property of a root role.

13. The computer program product of claim 9, wherein the programming instructions for managing said lifecycle comprises the programming instructions for:

calculating a transition path between two states for a certain role.

14. The computer program product of claim 13, wherein the programming instructions for calculating the transition path between two states for the certain role comprises the programming instructions for:

calculating a next reachable state by getting a property value of a class mapped from a current state;

transiting to the next state from which a target state can be reached when said next state does not contain the target state;

repeating the above steps until said next state contains the target state.

15. The computer program product of claim 9, wherein the programming instructions for managing said lifecycle comprises the programming instructions for:

providing user authority.

16. The computer program product of claim 15, wherein the programming instructions for providing user authority comprises the programming instructions for:

matching a user to a certain role in said lifecycle and determining the transitions that said certain role has authority to execute according to said role related control information.

* * * * *